(12) United States Patent
Kokuryo et al.

(10) Patent No.: US 7,154,241 B2
(45) Date of Patent: Dec. 26, 2006

(54) WIPER CONTROL METHOD AND WIPER CONTROL DEVICE

(75) Inventors: Kazuto Kokuryo, Ohtsu (JP); Shinji Nagao, Minato-ku (JP); Satoshi Furusawa, Minato-ku (JP)

(73) Assignee: Niles Co., Ltd., Tokyo (JP)

( * ) Notice: Subject to any disclaimer, the term of this patent is extended or adjusted under 35 U.S.C. 154(b) by 0 days.

(21) Appl. No.: 10/507,286

(22) PCT Filed: Feb. 28, 2003

(86) PCT No.: PCT/JP03/02317

§ 371 (c)(1),
(2), (4) Date: Sep. 10, 2004

(87) PCT Pub. No.: WO03/076240

PCT Pub. Date: Sep. 18, 2003

(65) Prior Publication Data

US 2005/0162116 A1   Jul. 28, 2005

(30) Foreign Application Priority Data

Mar. 13, 2002   (JP) .............................. 2002-068634

(51) Int. Cl.
*G05B 5/00* (2006.01)
*H02H 7/08* (2006.01)
*H02P 1/04* (2006.01)
*H02P 3/00* (2006.01)
*H02P 7/00* (2006.01)

(52) U.S. Cl. ...................... 318/483; 318/480; 318/443; 318/445; 318/461; 318/466

(58) Field of Classification Search .......... 318/DIG. 2, 318/420, 483, 443, 445, 461, 466, 468
See application file for complete search history.

(56) References Cited

U.S. PATENT DOCUMENTS 4,317,673 A * 3/1982 Thiele .......................... 504/138
4,463,294 A * 7/1984 Gibson ........................ 388/812

(Continued)

FOREIGN PATENT DOCUMENTS

JP   63-031849   2/1988

(Continued)

*Primary Examiner*—Lincoln Donovan
*Assistant Examiner*—Erick Glass
(74) *Attorney, Agent, or Firm*—RatnerPrestia

(57) ABSTRACT

There are provided a wiper control method and a wiper control device in which unnecessary wiping operation is not performed. When a fixed amount of water passing through a detection area 4, the water being carried by the wiping operation of a wiper 5b, is detected, the presence of impact of a raindrop on the detection area 4 is judged. When there is no impact of a raindrop on the detection area 4, it is judged that water that is carried by the wiper 5b and passes through the detection area 4 is caused by a factor other than rainfall, and control is carried out to decrease the frequency of wiping operation of the wiper.

11 Claims, 17 Drawing Sheets

U.S. PATENT DOCUMENTS

| | | | | |
|---|---|---|---|---|
| 4,554,493 A | * | 11/1985 | Armstrong | 318/444 |
| 5,266,873 A | * | 11/1993 | Arditi et al. | 318/483 |
| 5,304,936 A | * | 4/1994 | Buschur | 324/689 |
| 5,539,289 A | * | 7/1996 | Wiget | 318/583 |
| 5,773,946 A | * | 6/1998 | Montero | 318/460 |
| 6,184,642 B1 | * | 2/2001 | Ausiello | 318/483 |
| 6,268,612 B1 | * | 7/2001 | Teder | 250/574 |
| 6,397,161 B1 | * | 5/2002 | Tanaka et al. | 702/134 |
| 6,420,845 B1 | * | 7/2002 | Mackel et al. | 318/443 |
| 6,590,662 B1 | * | 7/2003 | Kokuryo et al. | 356/445 |
| 6,657,410 B1 | * | 12/2003 | Berger et al. | 318/483 |
| 2001/0028234 A1 | * | 10/2001 | Banhidy | 318/483 |

FOREIGN PATENT DOCUMENTS

| | | |
|---|---|---|
| JP | 63-071461 | 3/1988 |
| JP | 63-328998 | 11/1994 |
| JP | 10-203313 | 8/1998 |
| JP | 2002-293220 A | 10/2002 |

* cited by examiner

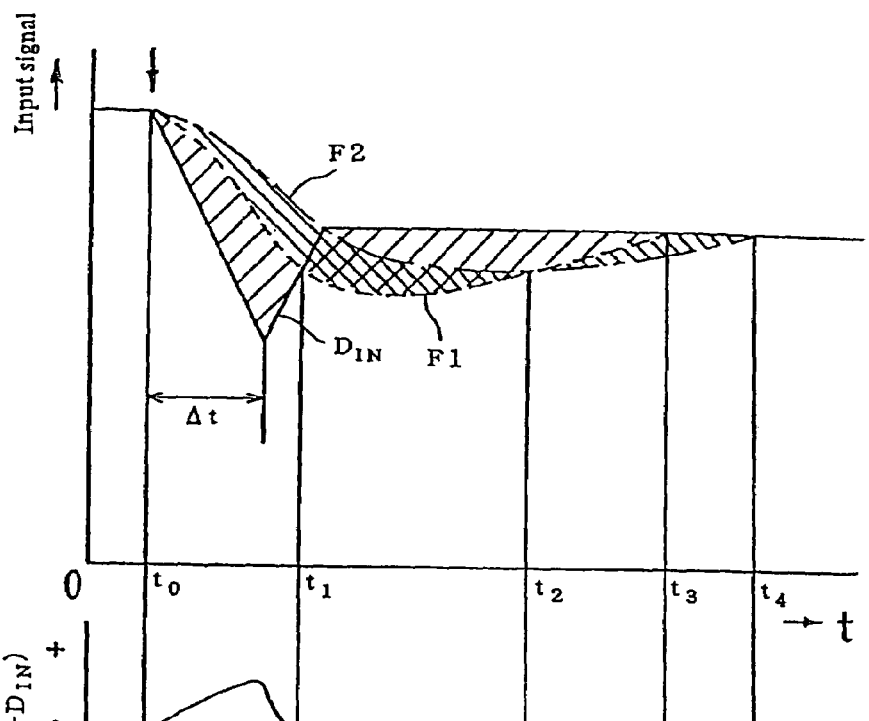
FIG. 6A
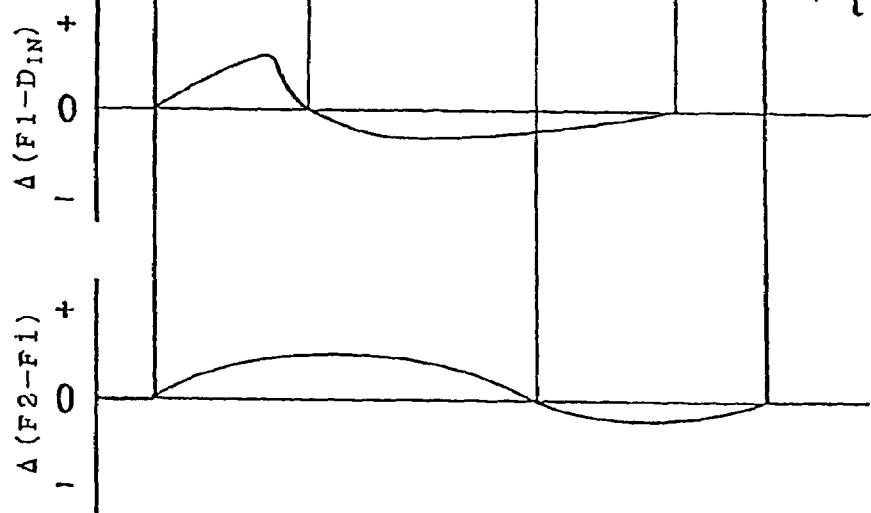
FIG. 6B
FIG. 6C

FIG. 8

| INPUT DATA | DATA TO BE AVERAGED | SHIFTED-OUT DATA | AVERAGED OUTPUT |
|---|---|---|---|
| Dn ··· | [D8｜D7｜D6｜D5｜D4｜D3｜D2｜D1] n |  | → F(1) |
| Dn ··· | [D9｜D8｜D7｜D6｜D5｜D4｜D3｜D2] n | D1 | → F(2) |
| Dn ··· | [D10｜D9｜D8｜D7｜D6｜D5｜D4｜D3] n | D2 | → F(3) |

$$F(1)=(D1+D2+\cdots +Dn)/n$$

$$F(2)=(D2+D3+\cdots +D(n+1))/n$$

$$F(3)=(D3+D4+\cdots +D(n+2))/n$$

| | | | | |
|---|---|---|---|---|
| | th3 | 18 | 9 | 6 |
| WATER AMOUNT | th2 | 12 | 6 | 4 |
| | th1 | 6 | 3 | 2 |
| | | W1 | W2 | W3 |

WAITING TIME

WIPER CONTROL METHOD AND WIPER CONTROL DEVICE

TECHNICAL FIELD

The present invention relates to a wiper control method and a wiper control device. More particularly, it relates to a wiper control method and a wiper control device in which unnecessary wiping operation is not performed in case of drizzling rain, at the time of finish of rainfall, or at the time when a vehicle goes into a tunnel from a rainfall situation.

BACKGROUND ART

A raindrop detecting device as shown in FIG. 19 has been proposed as an optical rain sensor for controlling a vehicular wiper. In such a detecting device, the detection area is extremely smaller than the wiping area of a wiper. Therefore, the detection sensitivity should be important performance for the detecting device.

Particularly in the drizzling rain, since the collision probability of raindrops with the detection area is very low, it is difficult for the wiper to be precisely controlled in such a situation.

To solve such a problem, WO91/03393 (National Publication of International Patent Application No. 4-507227) has disclosed a device for controlling a windscreen wiper "by the detection amount of optical energy corresponding to the size of water wall in advance of the windscreen wiper when the windscreen wiper passes through an incident point (detection area)".

Also, WO91/09756 (National Publication of International Patent Application No. 4-503791) has also disclosed a rainfall response type automatic wiper control system having "means for detecting the presence of waterdrop gathered and carried to a detection region by a wiper".

Further, the applicant of this invention has also disclosed a similar detecting device in Unexamined Japanese Patent Publication No. 2000-329862.

The techniques disclosed in the above-described three publications are useful as a technique for improving the detection probability of raindrops particularly in case of drizzling rain.

However, the water carried by the wiper is not only raindrops adhering to the wiping region of the wiper. For example, the wiper can carry water collecting in the stop position of the wiper.

If the wiper carries the above-described water after rain has stopped, the following trouble may occur: in such a detecting device, the wiper continues the wiping operation even when the wiping operation is not necessarily needed because rain has stopped.

Also, when a vehicle goes into a tunnel from a rainfall situation, the rainwater adhering to the roof of the vehicle may flow down to the wiping region of a wiper. Further, the rainwater having been wiped away to the outside of the wiping region by the wiper may flow down to the wiping region of the wiper.

In such cases, it is advantageous to wipe the flowing water by at least one wiping operation. In many cases, the visibility is secured by this wiping operation. In the above-described detecting device, however, the wiper is drenched by the wiping operation and carries water, so that there arises a problem in that the wiper continues its wiping operation even after the visibility has been secured.

DISCLOSURE OF THE INVENTION

Accordingly, an object of the present invention is to provide a wiper control method and a wiper control device in which unnecessary wiping operation is not performed even in the above-described cases.

In the present invention, when a given amount of water passing through the detection area, with the water being carried by wiping operation of a wiper is detected, the presence of an impact of a raindrop on the detection area is judged. Based on the result of this judgment, it is judged whether the water that is carried by the wiper and passes through the detection area is caused by rainfall or by a factor other than rainfall.

Thereby, in the case where there is no impact of a raindrop on the detection area even when the amount of water passing through the detection area, with the water being carried by the wiper, is not smaller than a predetermined value, it can be presumed that the water that is carried by the wiper and passes through the detection area is not due to rainfall, and further the vehicle is not in a rainfall situation. Thus, for example, the frequency of wiping operation of the wiper can be controlled properly, the period of wiping operation of the wiper can be increased, and further the operating mode can be transferred to a waiting mode.

In this description, the water carried by a wiper means water that is pushed away by the leading edge of a wiper blade with the travel direction of the wiper being the reference.

More specifically, the present invention provides a method for controlling an operation of a wiper by directing light emitted from a light emitting element to a detection area provided at a part of a wiper wiping region of a vehicular windshield glass, receiving light reflected on the detection area by a photo detector, and detecting a state of the detection area, comprising the steps of:

(a) detecting the amount of water passing through the detection area, with the water being carried by wiping operation of the wiper and;

(b) detecting an impact of a raindrop on the detection area;

(c) judging whether or not the amount of water passing through the detection area is not smaller than a predetermined threshold value;

(d) judging whether or not the impact of the raindrop on the detection area is detected if the amount of water passing through the detection area is not smaller than the predetermined threshold value; and (e) carrying out control to decrease frequency of wiping operation of the wiper if the impact of the raindrop on the detection area is not detected.

Also, the present invention provides a wiper control method comprising, carrying out control to decrease the frequency of wiping operation of the wiper when a judgment result that the amount of water passing through the detection area is not smaller than a predetermined threshold value and the impact of a raindrop on the detection area is not detected continues a plurality of times.

Further, the above-described invention of method can be brought into existence as the invention of device. Also, the above-described invention can be brought into existence as a program for providing a predetermined function to a control device for the wiper, computer, and microcomputer or as a recording medium storing the program.

Also, the means in this description can be achieved by hardware, software, or a combination thereof. The implementation by the combination of hardware and software corresponds to, for example, the implementation by a computer having a predetermined program.

The function provided by one means may be achieved by two or more pieces of hardware, software, or combination thereof, or the function of two or more means may be achieved by one piece of hardware, software, or combination thereof.

BRIEF DESCRIPTION OF THE DRAWINGS

FIGS. 6A, 6B and 6C are a chart for illustrating the measurement principle of this method;

FIG. 8 is a diagram for illustrating a digital filter;

Figure 1:
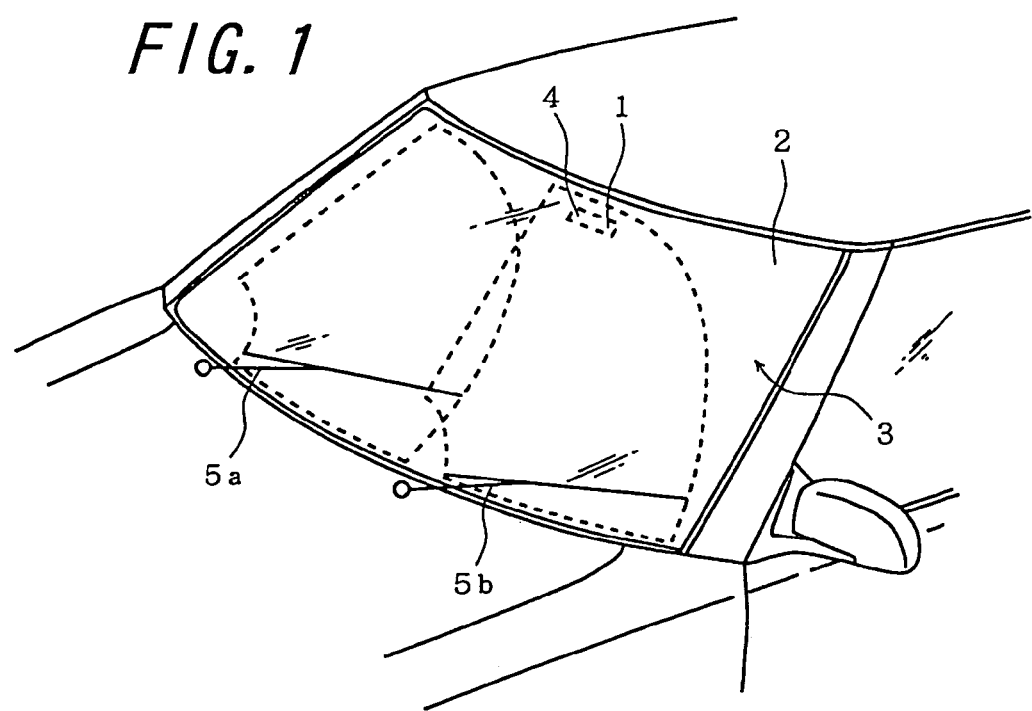
FIG. 1 is a perspective view showing an installation position of a wiper control device on a windshield glass.

BEST MODE FOR CARRYING OUT THE INVENTION (Principle of the Present Invention)

The inventors found the followings as the result of analysis.

The amount of water (herein, referred to as "water amount") passing through a detection area, with the water being carried by wiping operation of a wiper directly indicates the amount of waterdrop adhering to the wiper wiping region of a windshield glass. From the value of this water amount, it can be judged whether or not there is a waterdrop on the wiper wiping region of the windshield glass, and when there is a waterdrop, it can be judged what is the amount of waterdrop.

The dynamic impact (hit) of a raindrop on the detection area directly indicates the presence of a dynamic impact of a raindrop on the detection area on the windshield glass. From the value of this impact, it can be judged whether or not rainfall is present, that is, whether or not a vehicle is in a rainfall situation.

Next, when the amount of rainfall is large, the amount of waterdrop adhering to the windshield glass increases, and hence the amount of water carried by the wiper increases. Also, the density of raindrop in rainfall increases, and hence the probability of the dynamic impact of a raindrop on the detection area on a windshield glass (impact probability) increases as a necessary consequence.

Due to this analysis, it was verified that the water amount is proportional to the amount of rainfall, and the impact probability is proportional to the amount of rainfall. Therefore, under some condition, the amount of rainfall can be estimated from the water amount, and also it can be estimated from the impact probability.

On the other hand, when the situation changes suddenly from a rainfall environment, for example, when the vehicle goes into a tunnel from a rainfall situation, there takes place a phenomenon that rainwater adhering to, for example, the roof of vehicle flows down to the wiper wiping region, or rainwater having been wiped off to the outside of wiping region by the wiper flows down to the wiper wiping region, or the wiper carries water collecting at the wiper stop position. It was found that when such a phenomenon takes place, the water amount takes a large value although the vehicle is not in a rainfall situation. As a matter of course, it was verified that the dynamic impact (hit) of a raindrop is not detected in such a situation.

According to this fact, it was found that the water amount is not always proportional to the amount of rainfall. Also, it was found that particularly when the above-described phenomenon takes place, the water amount is not proportional to the amount of rainfall. Contrarily, the impact probability is proportional to the amount of rainfall even when the above-described phenomenon takes place and the water amount is not proportional to the amount of rainfall.

From the above-described fact, it can be said that the detection result that hit is not detected though the water amount is large indicates that the rainfall situation is not normal, and therefore it is unfavorable to judge the amount of rainfall on the basis of the value of the water amount.

In other words, when the water amount takes a large value, it can be inferred whether the value of water amount depends on rainfall or any other factor by referring to the detection result of the impact of a raindrop. Further, it can be inferred whether or not the vehicle is in a rainfall situation.

Also, the inventors found the followings as the result of analysis. When the above-described phenomenon takes place, a good visibility can be kept even if the wiping speed is slower or the period of wiping operation is longer than that in a rainfall situation. Furthermore, it was found that if the wiping speed and period are kept the same as those in a rainfall situation when the above-described phenomenon takes place, the wiping timing or wiping speed often deviates from the driver's sense, which may give a sense of strangeness to the driver. Therefore, when the above-described phenomenon takes place, for example, in a tunnel, the wiping timing etc. of the wiper is preferably controlled so as to match the driver's sense. Such a control can be achieved, for example, by decreasing the frequency of wiping operation of the wiper.

Hereunder, embodiments of a wiper control method and a wiper control device in accordance with the present invention will be explained by taking a motor vehicle as an example with reference to the accompanying drawings. The explanation is given of a case where the outside surface of vehicular windshield glass is a surface to be detected.

(Position of Detection Area on Windshield Glass)

Figure 2:
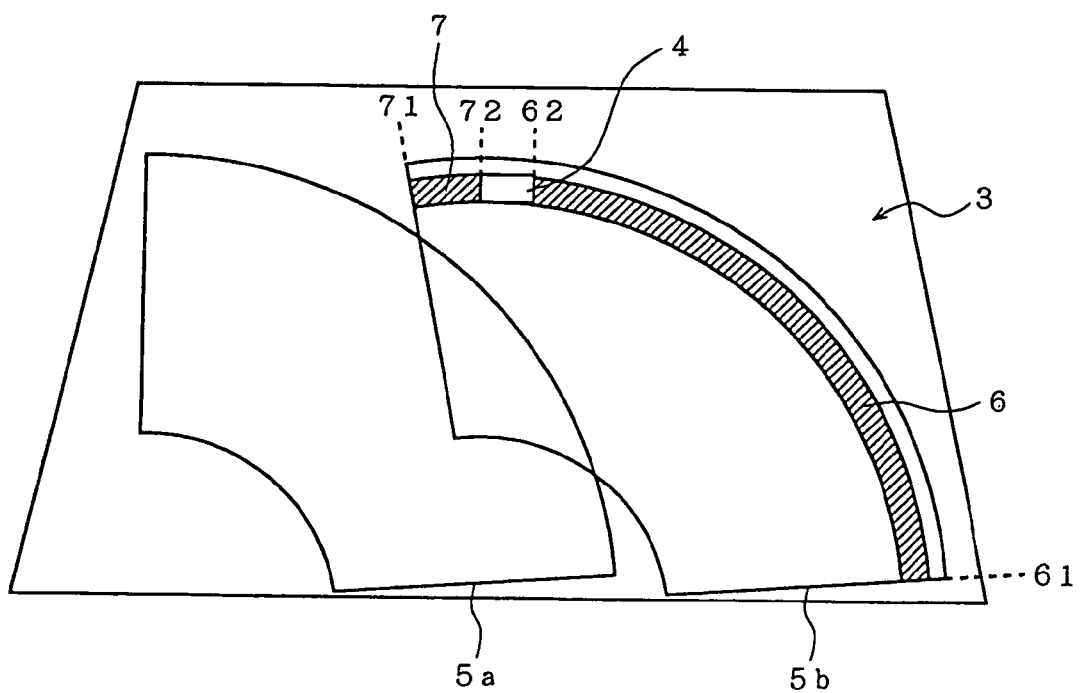
FIG. 2 is a view showing an installation position of a detection area.

First, the position of detection area on a windshield glass is explained with reference to FIGS. 1 and 2. FIG. 1 is a perspective view showing an installation position of the wiper control device on the windshield glass, and FIG. 2 is a view showing an installation position of the detection area.

As shown in FIG. 1, a wiper control device 1 is installed on the cabin side of a vehicular windshield glass 2 with an adhesive etc., not shown. That is to say, the outside surface of the windshield glass 2 is made a surface 3 to be detected, and a part of the surface 3 to be detected is set as a detection area 4.

The installation position of the wiper control device 1 on the windshield glass 2 is defined on the back side of a rear view mirror (not shown) not to hinder the driver's visibility. Also, the installation position of the wiper control device 1 is explained in relation to two wipers 5a and 5b. As shown in FIG. 2, the installation position of the wiper control device 1 is defined so that the detection area 4 is located within the wiping operation range of one wiper 5b and outside the wiping operation range of the other wiper 5a.

Next, the basic optical system that can be used in the present invention is explained. As the basic optical system, a system having the configuration similar to that explained in the above-described prior art can be used.

Figures 18, 19:
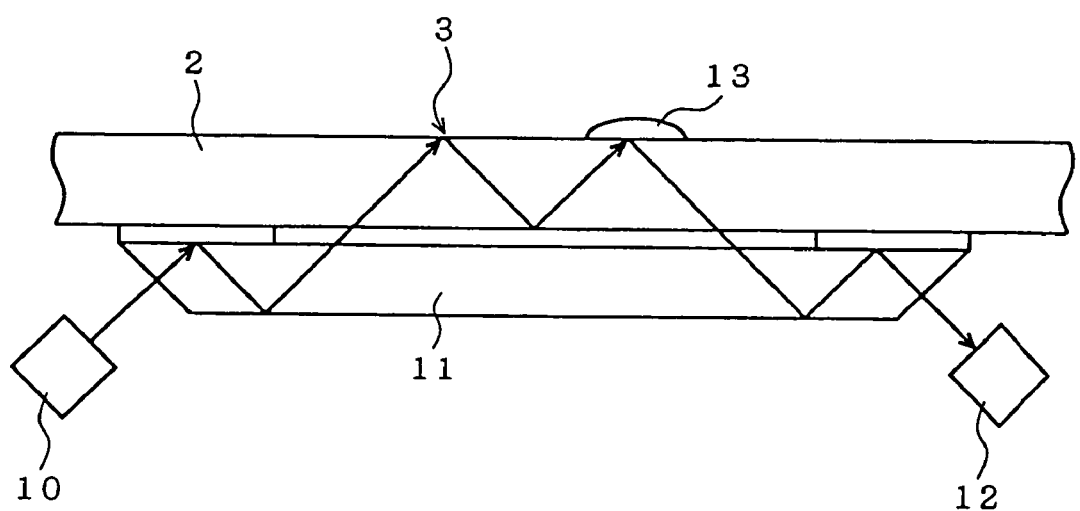
FIG. 18 is a matrix for illustrating the relationship between water amount, waiting time, and point value.
FIG. 19 is a schematic view for illustrating a conventional optical rain sensor.

As shown in FIG. 19, light emitted from a light emitting element 10 such as an LED is introduced to a glass substrate (windshield glass) 2, which is a transparent substrate to be detected waterdrops, through a prism glass 11 etc. The introduced light is totally reflected by the surface 3 to be detected, and enters a photo detector 12 such as a photodiode through the prism glass 11.

The wiper control device shown in FIG. 19 is configured so that the maximum output is generated in the photo detector in a state in which no waterdrop etc. exists on the detection area. Therefore, if there is adhesion 13 of a waterdrop etc. on the detection area, the output of the photo detector will decreases.

(Configuration of Wiper Control Device)

Figure 3:
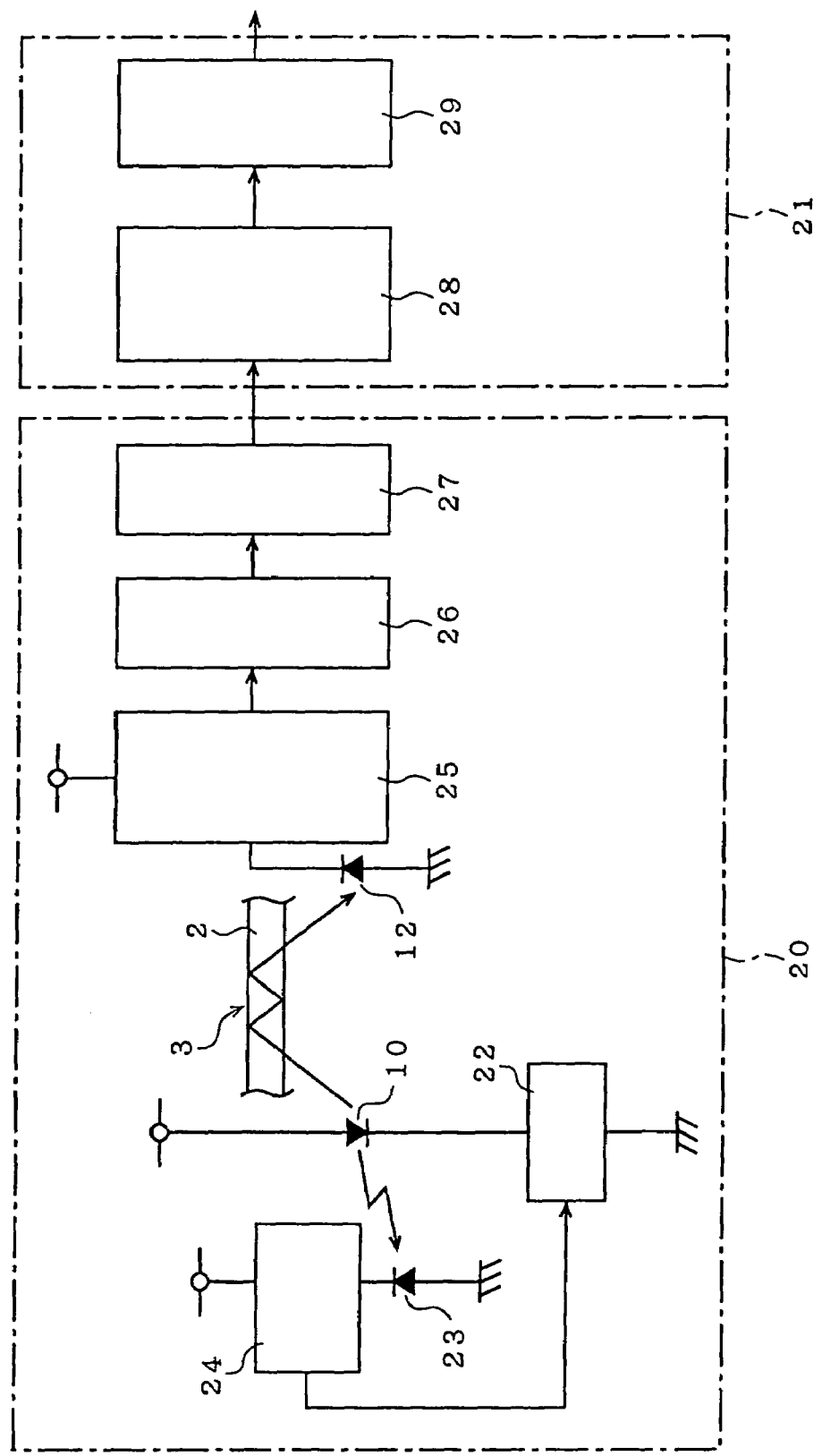
FIG. 3 is a diagram showing a configuration of the whole of a wiper control device.

Next, the configuration of wiper control device is explained with reference to FIG. 3. FIG. 3 is a diagram showing the configuration of the whole of the wiper control device. For convenience, the device is divided into a hardware part 20 and a software part 21.

The light emitting element 10 is preferably driven by a pulse waveform with a frequency (carrier frequency) not lower than 500 Hz. Also, since the light emitting properties of the light emitting element 10 change with temperature, the actual emitting light quantity is preferably monitored by using a monitoring photo detector 23 and a monitoring detection circuit 24. Further, it is preferable that the light emitting element 10 be driven by a driving circuit 22 while the monitoring result is fed back.

When light enters the photo detector 12, an output signal is generated. Since this output signal contains a carrier waveform used for driving the light emitting element, only an actual signal is first taken out by using a signal detection circuit 25.

It is preferable that the signal output from the photo detector is amplified by an amplifier circuit 26 because it is normally difficult to obtain a large volume signal output by the photo detector available in commercial use.

Continuously, the amplified signal is input to an A/D converter 27, and converted into a digital data. At this time, the dynamic range of the A/D converter 27 can be properly set according to the output signal of the optical system mentioned above.

The output signal from the A/D converter 27 is sent to a detecting section 28. The detecting section 28 detects the dynamic impact of a raindrop on the detection area from the input signal. Also, the detecting section 28 detects the amount of water passing through the detection area, with the water being carried by the wiper, from the input signal.

That is to say, the detecting section 28 has means for detecting the dynamic impact of a raindrop on the detection area and means for detecting the amount of water passing through the detection area, with the water being carried by the wiper.

Next, the output signal from the detecting section 28 is input to a judging section 29. The judging section 29 judges whether or not the water that is carried by the wiper and passes through the detection area is due to rainfall, from the dynamic impact of a raindrop on the detection area and from the amount of water passing through the detection area, with the water being carried by the wiper, which are both detected by the detecting section 28. For example, if no raindrop impacts on the detection area when a large amount of water passes through the detection area, it is estimated that this water is due to a factor other than rainfall.

The judging section 29 may be configured so as to send a control signal to a motor vehicle controlling computer (not shown) to control wiper operation via that motor vehicle controlling computer. Also, it may be configured so as to control a wiper driving motor directly.

The above-described detecting section 28 and judging section 29 can be configured by software.

(Method for Detecting Amount of Water Passing Through Detection Area)

Figure 4:
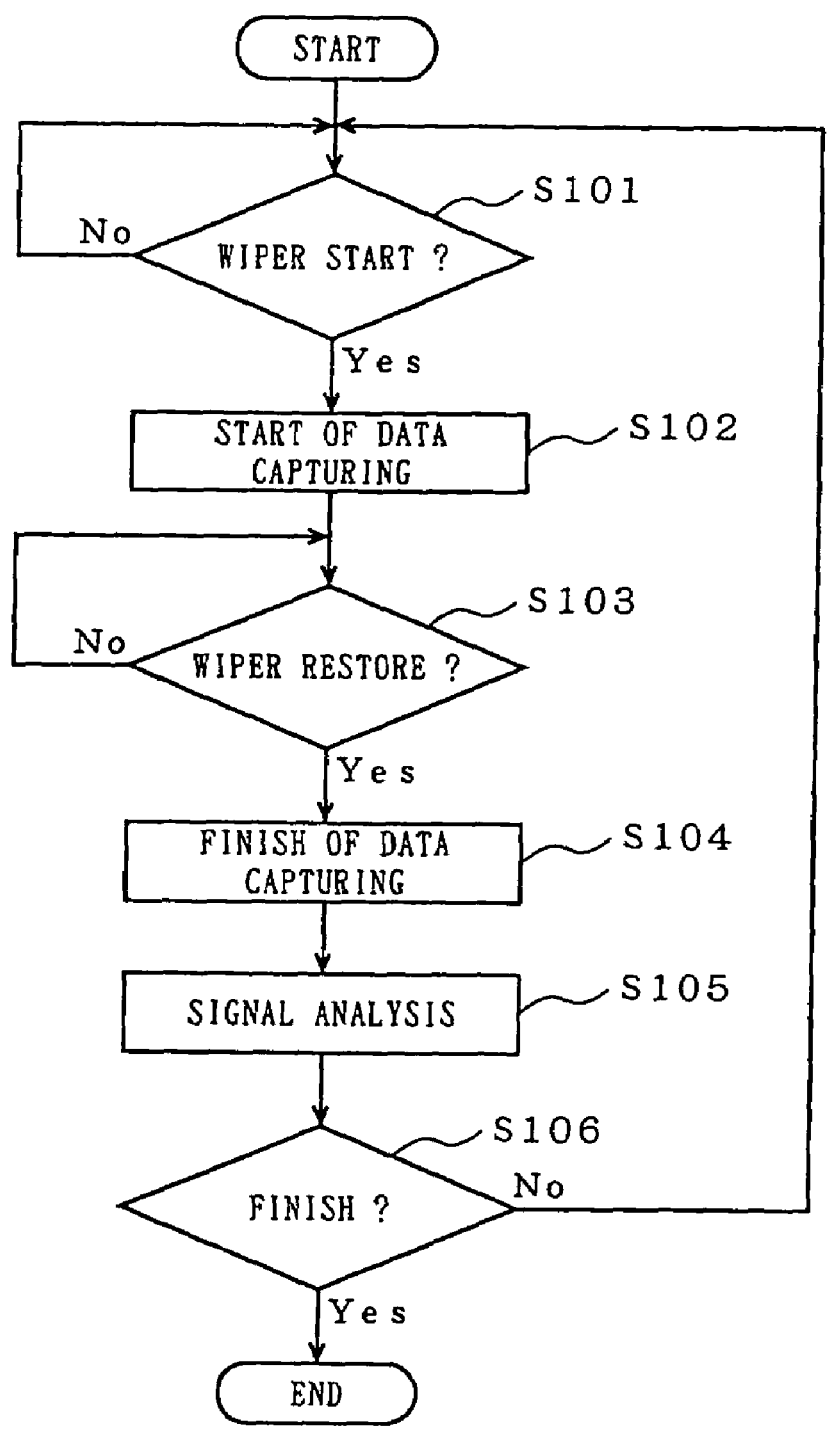
FIG. 4 is a flowchart for illustrating processing for detecting the amount of water passing through a detection area.

Next, processing in which the detecting section 28 detects the amount of water passing through the detection area, with the water being carried by a wiper, is explained with reference to FIG. 4. FIG. 4 is a flowchart for illustrating the processing for detecting the amount of water passing through the detection area. The detecting section 28 executes the processing based on the flowchart schematically shown in FIG. 4.

When a start signal of the wipers 5a and 5b is received from the motor vehicle controlling computer (not shown) (Step 101), that is, when the wipers 5a and 5b start their wiping operations at the stop positions at the lower end of the windshield glass, the capturing of output signal from the A/D converter 27 is started, and the output signal is stored in a memory, not shown (Step 102).

When a restoration signal telling that the wipers 5a and 5b have reversed at reversion positions and subsequently restored to the original stop position again is received from the motor vehicle controlling computer (Step 103), the storage of output signal from the A/D converter 27 is finished (Step 104).

Figure 5:
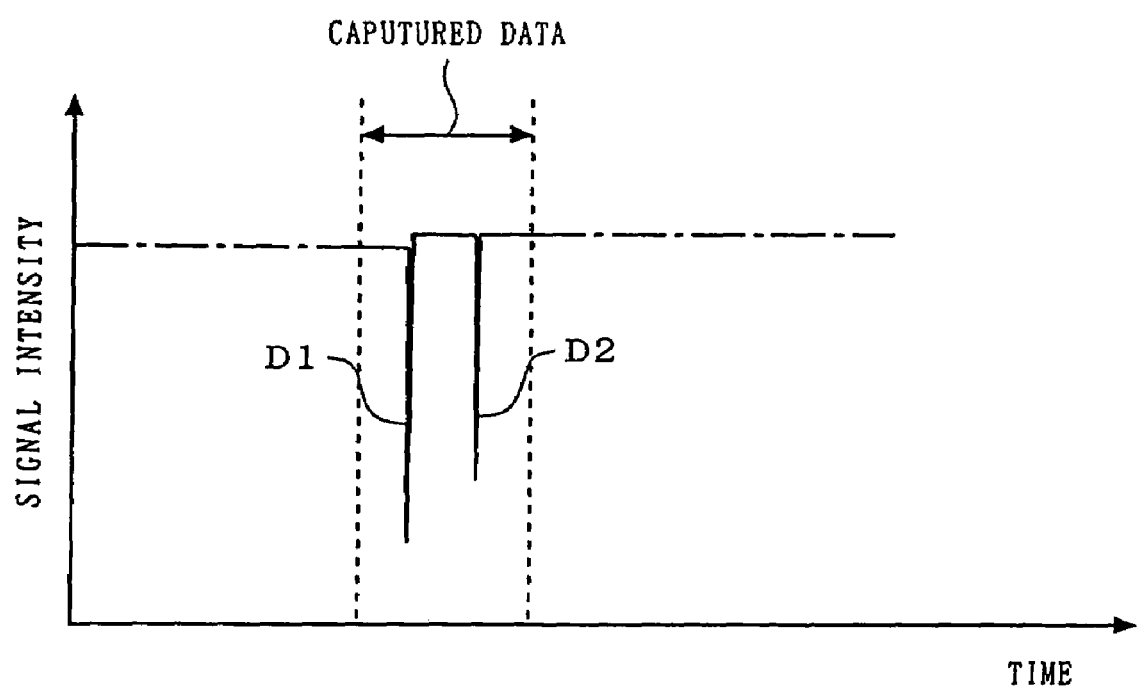
FIG. 5 is a chart typically showing a signal in a rainfall state.

After the output signal from the A/D converter 27 is captured in this manner, the detecting section 28 judges the amount of water based on the captured signal (Step 105). The signal captured from the A/D converter 27 is specifically as typically shown in FIG. 5. FIG. 5 is a chart typically showing a signal in a rainfall state.

In the example of signal shown in FIG. 5, it is found that two deep dips D1 and D2 are present in the range of the captured signal, and that the level of the output signal of the photo detector 12 decreases significantly at these dips. Of these two dips D1 and D2, the first appearing dip D1 is a signal change at the time when the wiper 5b passes through the detection area 4 during its movement from the stop position to the reversion position, and the next appearing dip D2 is a signal change at the time when the wiper 5b passes through the detection area 4 during its movement from the reversion position to the original stop position.

As shown in FIG. 2, when the wiper 5b passes through the detection area 4 during its movement toward the reversion position, the wiper 5b reaches the detection area 4 while gathering rainwater substantially in the area from 61 to 62 (hatched portion 6). Also, in case of movement of the wiper 5b after reversion, the wiper 5b reaches the detection area 4 while gathering rainwater substantially in the area from 71 to 72 (hatched portion 7).

Therefore, the rainwater in the area of the hatched portion 6 will appear as the dip D1 in FIG. 5, and the rainwater in the area of the hatched portion 7 will appear as the dip D2. Besides the rainfall state, as described above, the rainwater adhering to the roof of vehicle flows down to the wiper wiping region, or the rainwater having been wiped off to the outside of the wiping region by the wiper flows down to the wiper wiping region, or the wiper carries the water collecting in its stop position. Even in such a case, as long as the rainwater existing in the areas of the hatched portions 6 and 7 has the same quantity, a signal waveform equivalent to the signal waveform shown in FIG. 5 will be obtained. Therefore, even before and after the situation change such that the vehicle goes into a tunnel from a rainfall situation and the rainwater adhering to the roof of a vehicle flows down, when the amount of rainwater adhering to the hatched portions 6, 7 of windshield glass does not change, the same signal waveform will continue.

When the signal typically shown in FIG. 5 is obtained, the detecting section 28 identifies timing at which the wiper 5b passes through the detection area 4 based on the length of time in which the output signal from the A/D converter 27 is captured in order to judge the amount of water based on the data at that timing. That is to say, the amount of water is judged based on the information output from the photo detector 12 at the time when the wiper 5b passes through the detection area 4. For example, the amount of water is judged from a peak value at the timing of the passage of the wiper 5b above-described (peak value of signal change), and is sent to the judging section 29. During the wiping operations of the wipers 5a and 5b are performed, the above-described processing is executed each time the wipers 5a and 5b reciprocate. When a finish is separately commanded (Step 106), the processing is finished.

(Method for Detecting Impact of Raindrop on Detection Area)

Next, a method for detecting the dynamic impact of a raindrop on the detection area is explained. As the method for detecting the dynamic impact of a raindrop on the detection area, for example, a method disclosed in Unexamined Japanese Patent Publication No. 2001-180447 by the inventors can be used. Hereunder, this method is explained specifically.

The principle of this method is explained with reference to FIG. 6. FIG. 6 is a chart for illustrating the measurement principle of this method. FIG. 6A shows an example of input signal model at the time when a waterdrop impacts dynamically on the detection area (when a waterdrop collides). From the photo detector 12, its output signal is input ($D_{IN}$). From this input signal ($D_{IN}$), a signal (F1) of its time lag component can be generated. Further, a differential signal ($\Delta(F1-D_{IN})$) can be produced which is obtained by subtracting the input signal ($D_{IN}$) from the time lag signal (F1). FIG. 6B schematically shows the differential signal.

In the differential signal ($\Delta(F1-D_{IN})$), a positive difference occurs during the period of time from t0 to t1, and a negative difference occurs during the period of time from t1 to t3.

In FIG. 6A, a waterdrop begins to impact on the detection area at time point (t0) indicated by an arrow mark (↓) in the figure, and time period indicated by $\Delta t$ corresponds to the collapse of the waterdrop. The subsequent flat signal portion is a signal model expressing a state in which the waterdrop has spread.

It is found that in this dynamic impact, a difference occurs. That is to say, by detecting the occurrence of differential signal, the impact of a waterdrop on the detection area can be detected.

If the difference is taken as a value obtained by subtracting the input signal from the time lag signal, when the difference is positive, it can be judged that a waterdrop impacted on the detection area. In this case, however, the occurrence of negative difference is not used to detect the impact of a waterdrop.

If the dynamic impact of a waterdrop can be judged, for example, the presence of an impact of a waterdrop or the number of impacting waterdrops is determined, and the operation of a wiper can be controlled based on such a determination.

If the degree of adhesion state of waterdrops (i.e. wetting) is low level, the decrease in signal from the photo detector is small. In the judgment by comparison with a reference value, it is impossible to set a threshold value for a signal of the same degree as that of the noise level. That is to say, in the comparison with the reference value, if the degree of adhesion state of waterdrops (wetting) is low level, the impact of water cannot be judged.

On the other hand, in this method, since the dynamic impact of a waterdrop can be judged, even for the waterdrop that is too small to be distinguished from the noise level, the impact of a waterdrop can be judged exactly. That is to say, even the impact of a small raindrop can be detected.

In the above-described explanation, judgment is made by the occurrence of differential signal ($\Delta(F1-D_{IN})$) which is obtained by subtracting the input signal model ($D_{IN}$) from the time lag signal (F1). However, it is preferable that a signal (F2) of time lag component be generated from the F1 signal, and the dynamic impact of a raindrop be judged by the detection of occurrence of a difference between F2 and F1, for example, ($\Delta(F2-F1)$) (refer to FIG. 6C).

The reason for using F2 signal is as described below: the A/D converted input signal contains a quantization error, and the pattern processing using the differential signal is suitable for capturing a minute difference, but is generally vulnerable to noise.

In the differential signal ($\Delta(F2-F1)$), a positive difference occurs during the period of time from t0 to t2, and a negative difference occurs during the period of time from t2 to t4.

Figure 7:
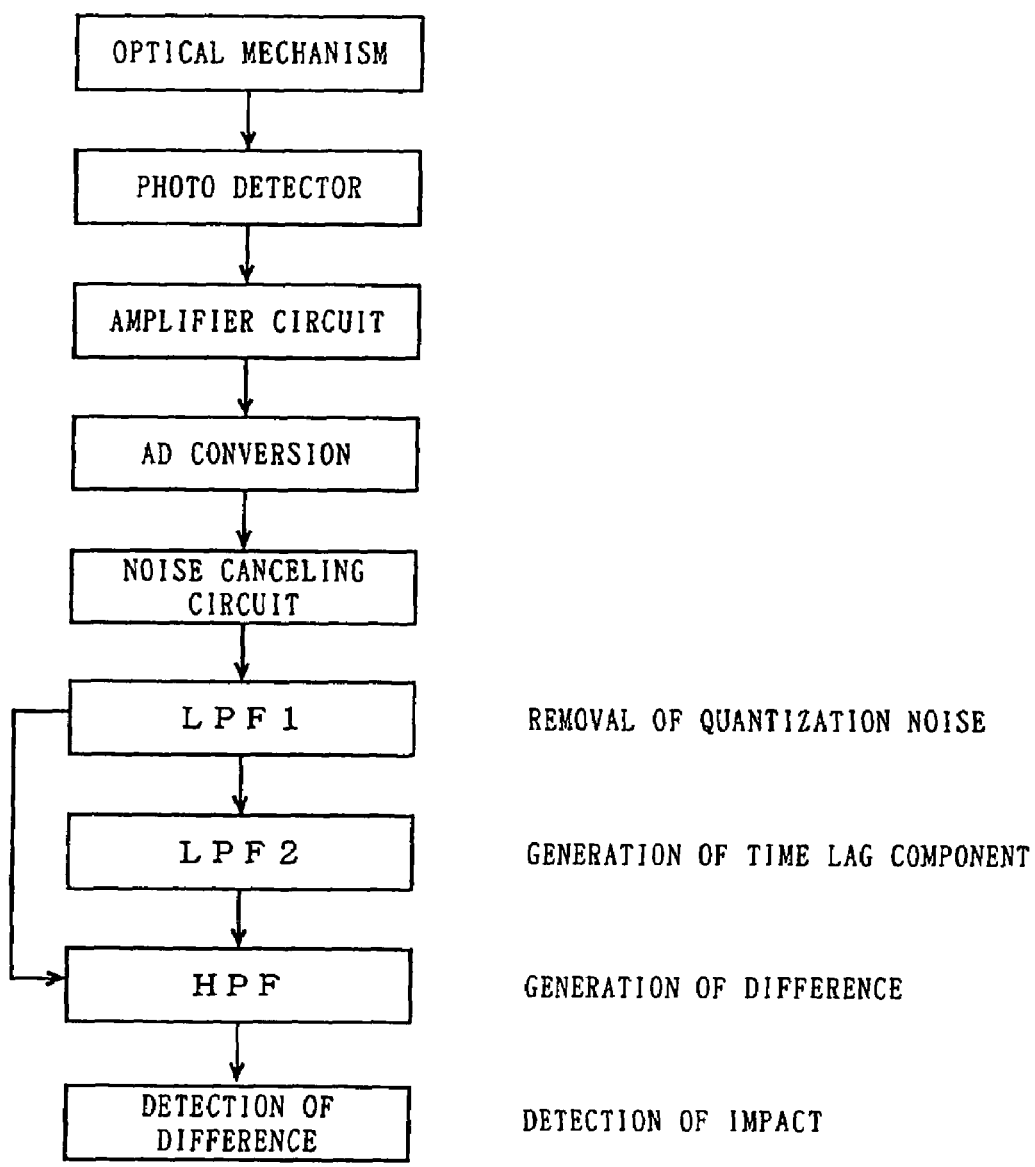
FIG. 7 is a flow diagram for illustrating steps for detecting a raindrop.

Next, a detection logic of a raindrop etc. in the detecting section 28 in accordance with the present invention is explained for each step (refer to FIG. 7). FIG. 7 is a flow diagram for illustrating steps for detecting a raindrop.

It is preferable that the output of the A/D converter 27 is previously input into a noise canceling filter in order to cancel the spike noises generated by an irregular light coming from inside or outside of vehicle. This noise canceling processing also can be performed with software.

[LPF1]: Removal of Quantization Noise

First, the output from the noise canceling filter is further caused to pass through a digital filter 1 (LPF1). This filter 1 is used to remove a quantization error occurring in the digital conversion of the A/D converter 27, circuit noise, and the like. The output (F1) from the filter 1 may be understood as a first-order time lag signal from the input signal ($D_{IN}$).

The noise removal in the LPF 1 is effected as described below. Averaging is performed by dividing the total value of the predetermined number of the sampling signal input sequentially by the number of samples. The predetermined number of samples should be determined so that spike-like noise can also be removed to some extent in the LPF1.

The predetermined number of samples can be determined as described below. First, the maximum noise level that can be thought in this circuit is measured, and a digit value corresponding to this is set. The predetermined number of samples can be determined so that this maximum noise can be removed, that is, the value obtained by dividing that digit value by a certain number of samples is "0".

Also, normal level noise can be removed by sequentially averaging the input value. It is preferable that the data processing by this invention does not perform the floating point processing and omits decimals for high-speed processing.

The averaging processing is explained in more detail with reference to FIG. 8. FIG. 8 is a chart for illustrating the digital filter. There are input data (Dn), and data cells used for averaging are provided. For example, if the number of samples for averaging is "8", data are input sequentially in these eight data cells. The sum of the value of eight data is divided by the number of samples of 8, by which an averaged value (F(1)) is output. Next, D9 is input in the data cell, and D1 is shifted out. The sum of current 8 data is also divided by the number of samples, by which an averaged value (F(2)) is output. This processing is repeated and thereby an averaged value (F(n)) is output sequentially.

[LPF2]: Generation of Time Lag Signal

The quantization noise-canceled signal (F1) is input to a digital filter 2 (LPF2). In this filter 2 as well, as in the filter 1, averaging is performed by dividing the total value of the predetermined number of the sampling signal input sequentially by the number of samples. By averaging the input signals in this manner, a signal (F2), which is a time lag component of the signal (F1), can be generated from the noise-canceled signal (F1). The output (F2) from the filter 2 may be understood as a second-order time lag signal from the input signal ($D_{IN}$).

The above-described two-stage filtering may be understood as a low-pass filter for cutting high-frequency components. Also, this filtering can be achieved by an analog circuit. For the analog circuit, it is difficult for the circuit constant to be changed easily, so that a digital filter is preferably used.

[HPF]: Generation of Differential Signal

Subsequently, the two signals from the filters 1 and 2 are sent to a digital filter 3, by which a difference between F1 and F2 is determined to generate a differential signal. For example, the F1 signal may be subtracted from the F2 signal. The filtering for generating the difference value may be understood as a high-pass filter for extracting a high-frequency component of the difference between F1 and F2.

[Detection of Differential Signal]: Detection of Impact

By capturing the occurrence of this differential signal, the dynamic impact of a raindrop etc. can be judged. For example, if the differential signal is assumed to be a value obtained by subtracting the F1 signal from the F2 signal, when the difference value is positive, it can be judged that a raindrop etc. has impacted on the detection area. Inversely, if the differential signal is assumed to be a value obtained by subtracting the F2 signal from the F1 signal, when the difference value is negative, it can be judged that a raindrop etc. has impacted on the detection area.

The canceling of quantization noise (first-order time lag signal (LPF1)) is effected by the averaging 8 data (n=8), and the generation of time lag component (second-order time lag signal (LPF2)) is effected by the averaging 4 data (n=4). The reason why the number n of data for LPF2 is less than that of LPF1 is that noise already has been canceled by LPF1.

Figure 9A:
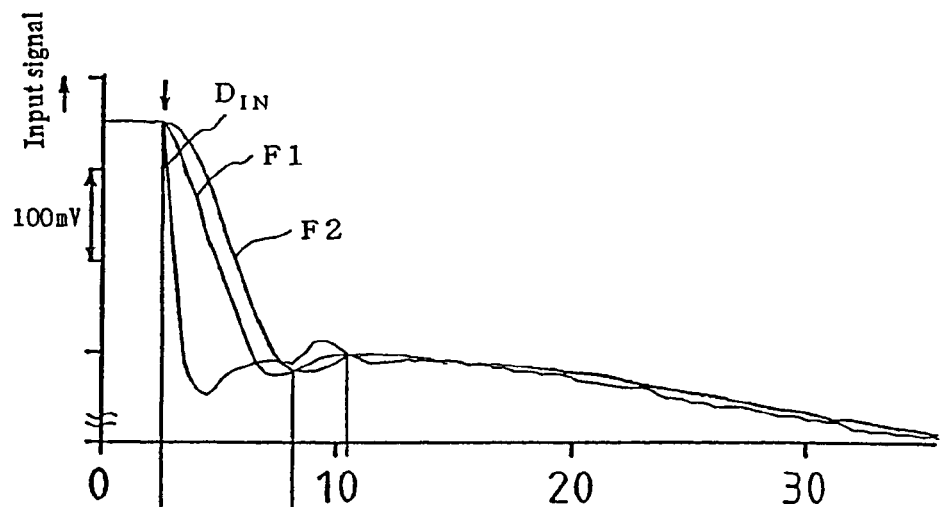
FIGS. 9A and 9B are a chart showing a signal at the time of the impact of a raindrop and a processed signal.
Figure 9B:
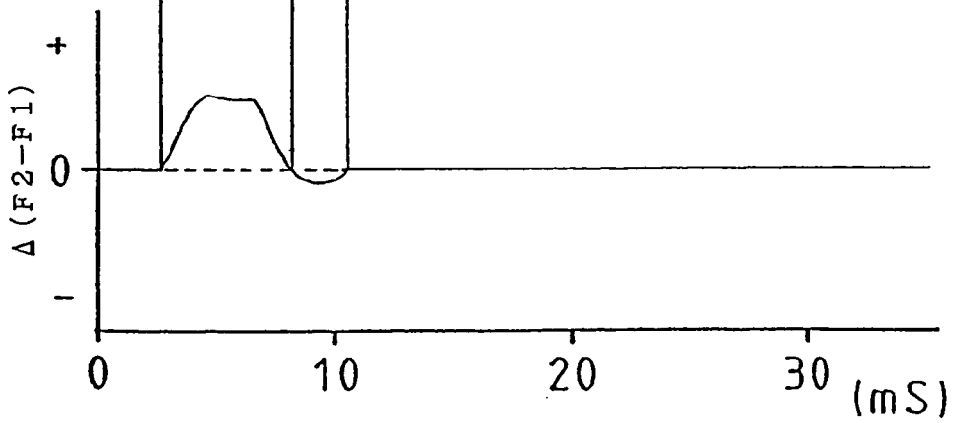

FIG. 9 is a chart showing an actual signal and a result of processing of the signal. The graph of FIG. 9A shows the actual input signal (DIN), the noise-canceled (first-order time lag) signal (F1), and the (second-order) time lag signal (F2). Further, the graph of FIG. 9B shows the differential signal obtained by subtracting the F1 signal from the F2 signal. The abscissas represent time. In FIG. 9, a raindrop begins to impact on the detection area at timing indicated by an arrow mark (↓). FIG. 9 is a chart showing a signal at the time of a raindrop impacts and a processed signal.

As is apparent from FIG. 9, it is found that in this case, a positive differential signal (Δ(F2−F1)) occurs in response to the impact of a raindrop.

Further, from the result shown in FIG. 9, the followings can be verified: in the case where the time lag signal (F2) is generated from the noise-canceled signal (F1), the lag amount is large when the F1 signal varies rapidly, and inversely the lag amount is small when the F1 signal does not vary so much.

Furthermore, it can be verified that if the differential signal Δ(F2−F1) between F2 and F1 is generated, a large difference is generated when the F1 signal varies rapidly, and inversely a difference scarcely occurs when the F1 signal does not vary so much.

Also, for example, when the output of the light emitting element shifts slowly, the output of the photo detector also shifts. In such a case, in the conventional detection method using a threshold value, accurate detection is difficult to do with the threshold value being fixed. Therefore, a complicated judgment logic is naturally needed.

On the other hand, in the method in accordance with the present invention, in which a differential signal from the time lag signal is detected, the shift amount can be canceled by obtaining the differential value, so that a raindrop impact can be detected precisely. Also, the judgment logic is very simple because it merely detects the occurrence of difference.

Figure 10A:
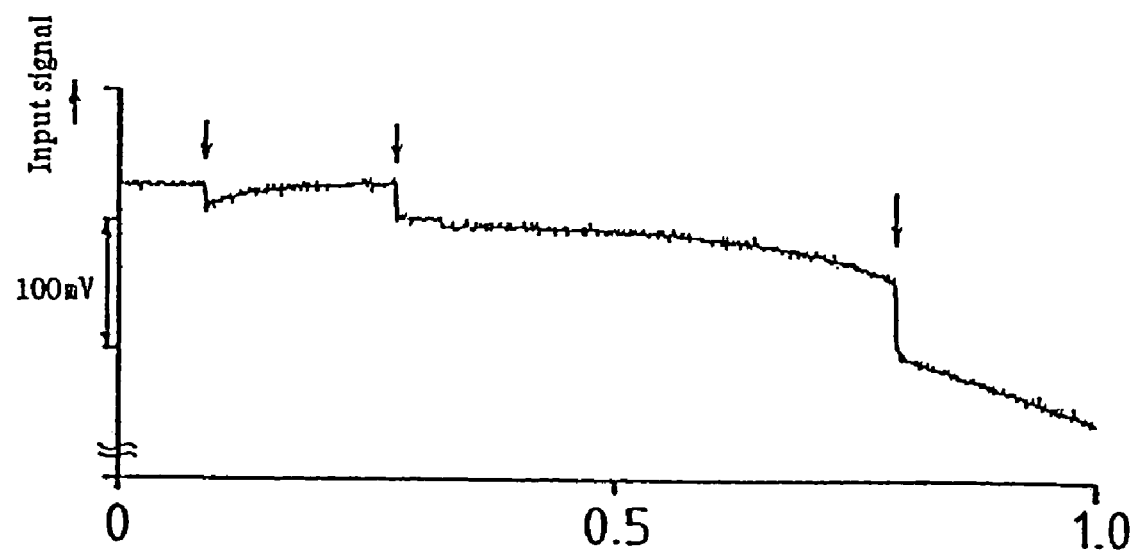
FIGS. 10A and 10B are charts showing a signal in case of drizzling rain.
Figure 10B:
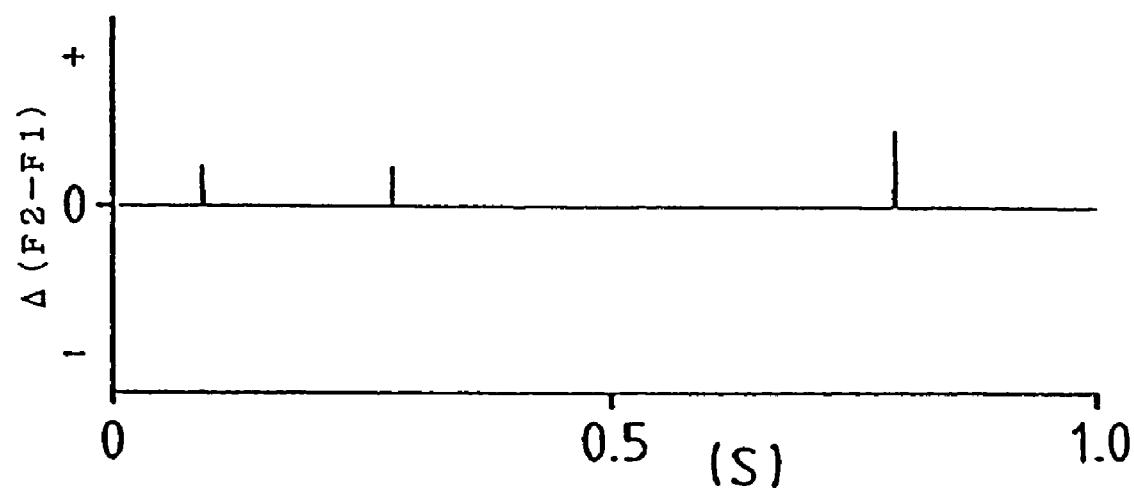
Figure 11:
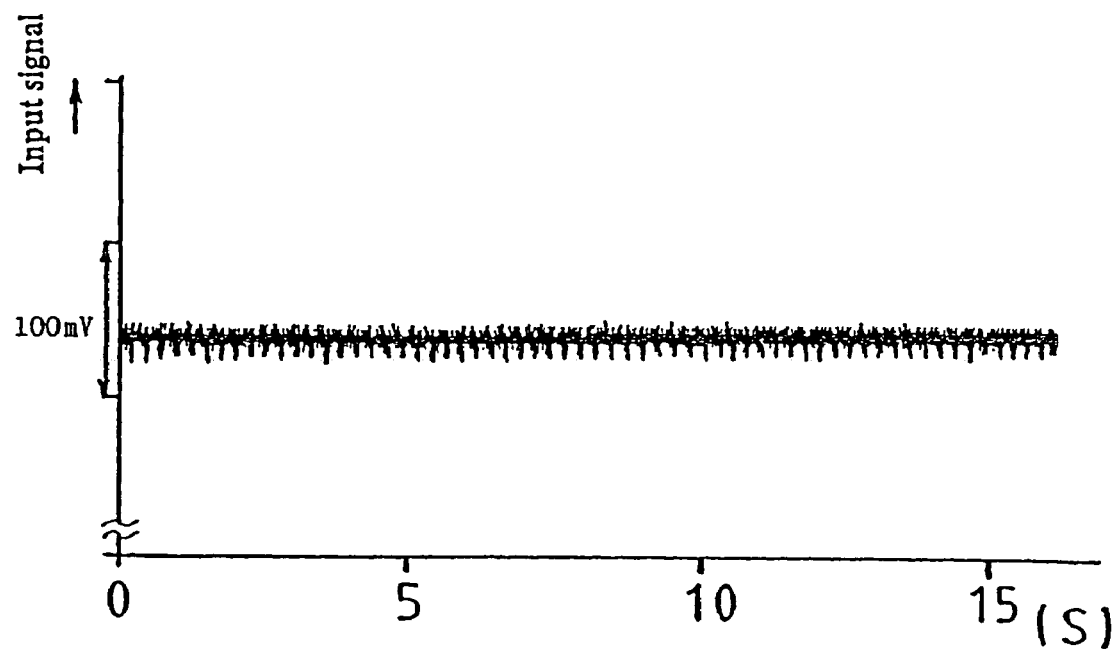
FIG. 11 is a chart showing a noise level of a detecting device.

Next, FIG. 10 shows a signal example at the time when a small raindrop impacts on the detection area. FIG. 10 is a chart showing a signal in case of drizzling rain, and FIG. 11 is a chart showing a noise level of a detecting device. In FIG. 10, a raindrop impacts on the detection area at timing indicated by arrow marks (↓). The time axis of abscissa is different from that of FIG. 9. The concrete noise level of detecting device is about 25 mV as shown in FIG. 11.

The change amount of signal at the time when a small raindrop impacts is about 23 mV or about 30 mV, which is not so different from the noise level. However, it could be verified that a positive differential signal occurs corresponding to the impact of the raindrop. That is to say, with this method, even for a small raindrop which has an impact similar to noise level, the impact thereof can be detected precisely.

(Method for Detecting Impact of Raindrop on Detection Area by Threshold Method)

As another method for detecting the impact of raindrop on the detection area, there can be used a well known method in which rainfall is detected by comparing a change in output signal of the photo detector with a reference value (what is called a threshold method) (for example, Unexamined Japanese Patent Publication No. 10-186059).

Further, a method in which a plurality of reference values are set according to various modes (Unexamined Japanese Patent Publication No. 10-186059) or a method in which the reference value is successively updated (Unexamined Japanese Patent Publication No. 2-68248) may be used.

In the above-described methods, the impact of raindrop may be detected by comparing the change in quantity of light entering the photo detector with a fixed threshold value.

(Processing in Judging Section)

Figure 12:
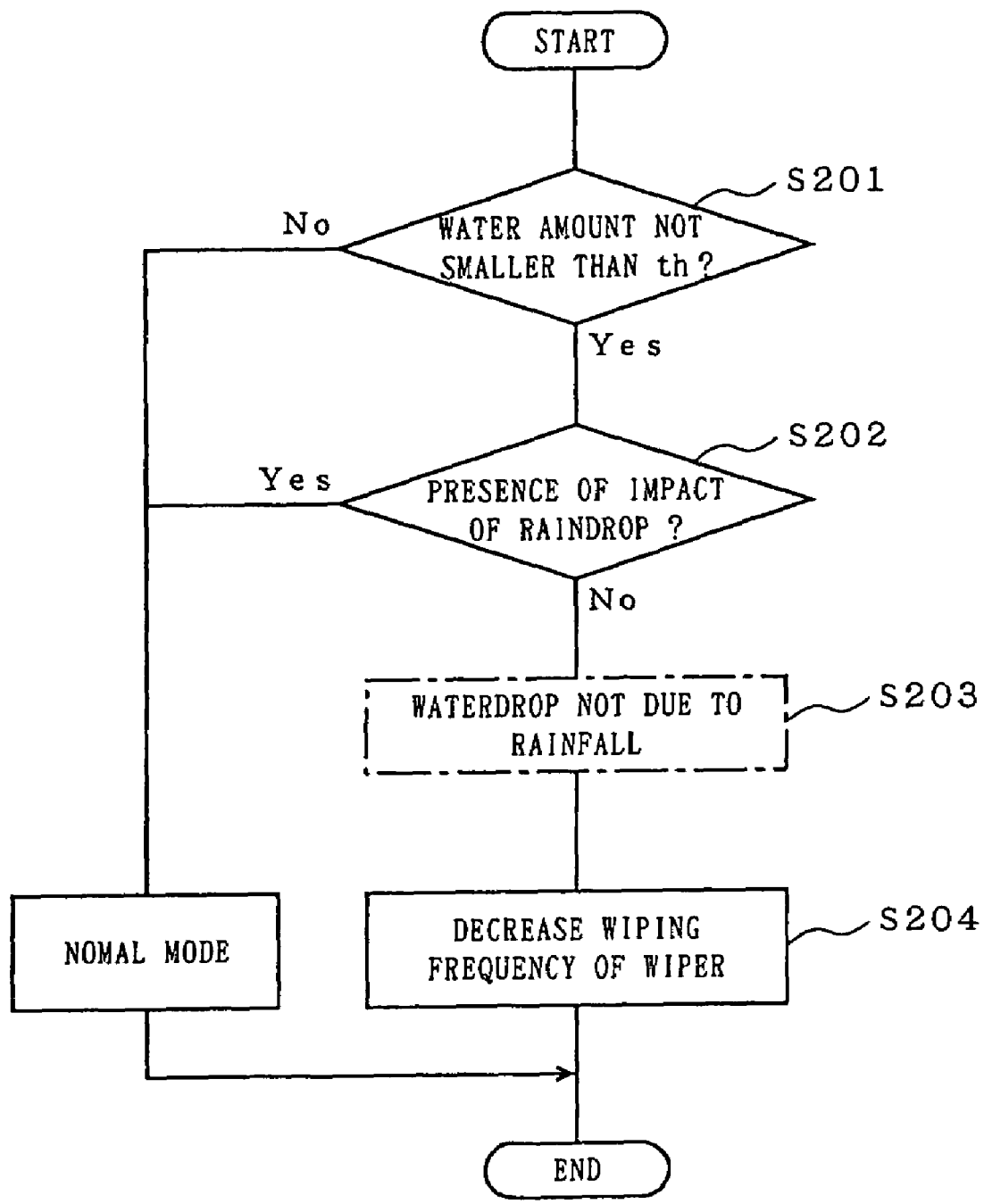
FIG. 12 is a flowchart for illustrating the processing of a judgment section.
Figure 13:
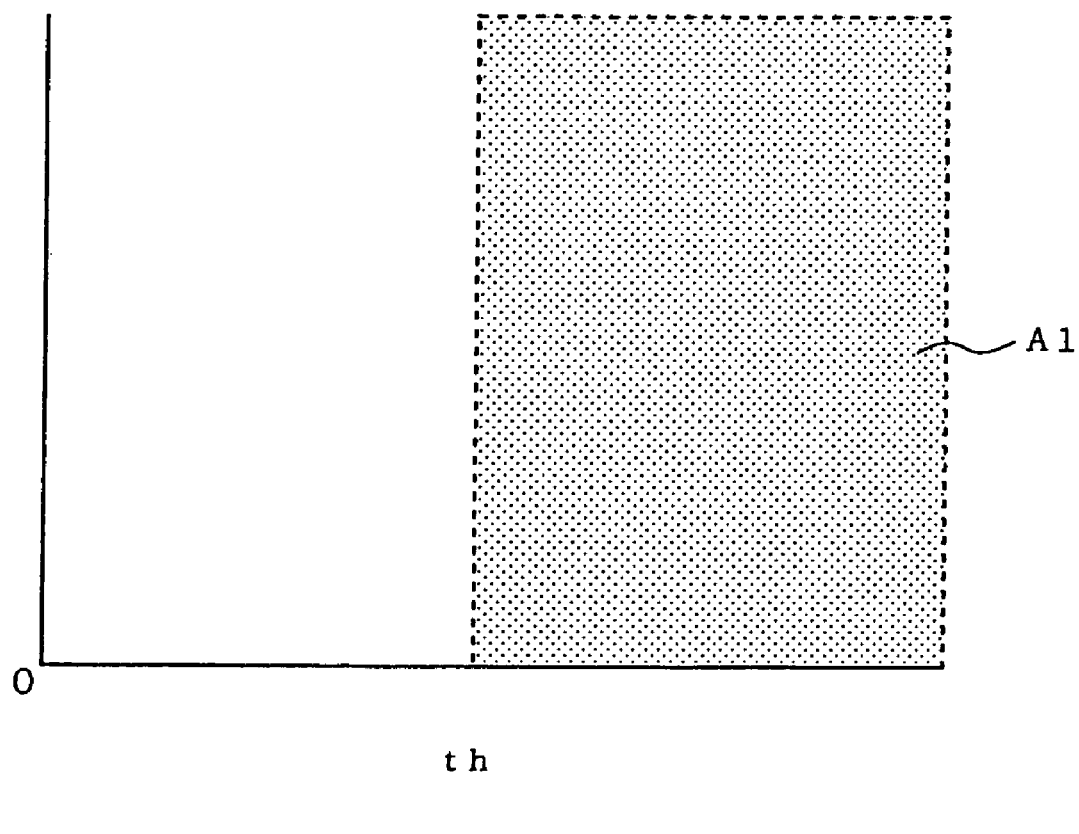
FIG. 13 is a diagram showing the amount of water passing through a detection area.
Figure 14:
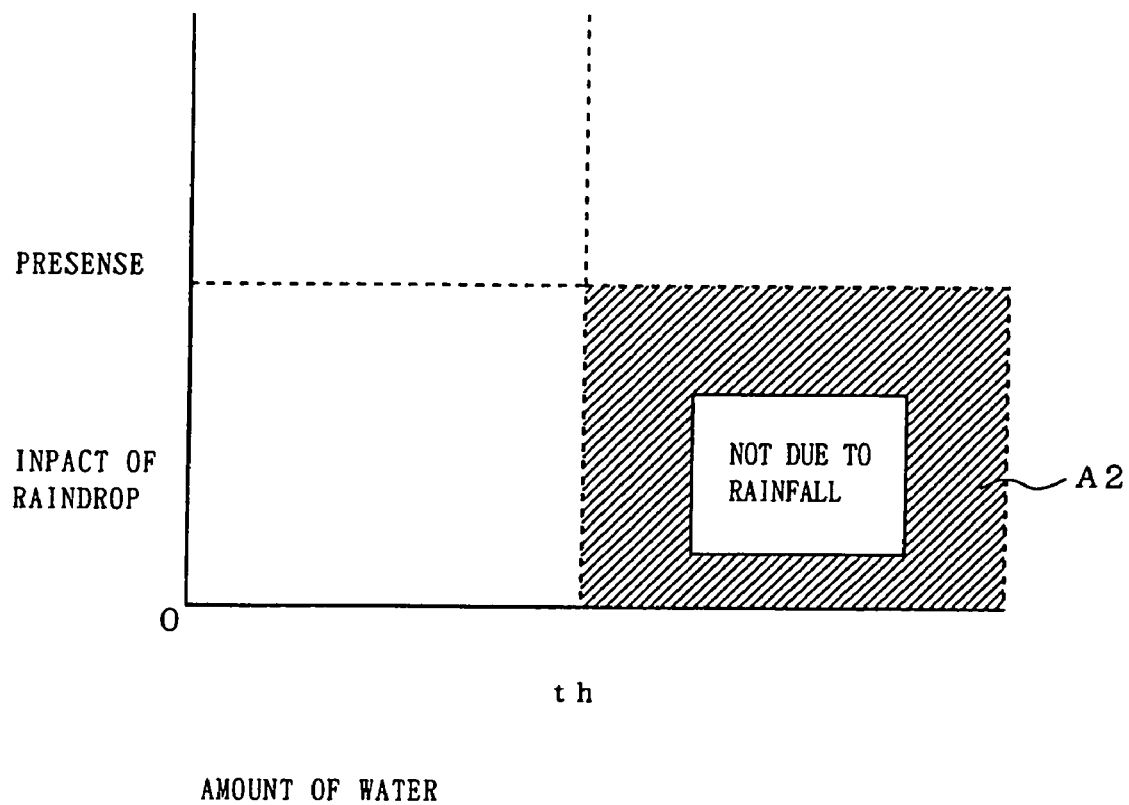
FIG. 14 is a diagram showing the relationship between water amount and raindrop impact.

The result of the detection for the amount of water passing through the detection area and the result of the detection for the impact of a raindrop on the detection area, which are output from the detecting section 28, are input to the judging section 29. The judging section 29 performs judgment processing described below based on these inputs. Specifically, it performs the processing shown in FIG. 12. FIG. 12 is a flowchart for illustrating the processing of the judgment section, FIG. 13 is a chart showing the amount of water passing through the detection area, and FIG. 14 is a chart showing the relationship between water amount and raindrop impact.

The judging section 29 first judges whether or not the amount of water passing through the detection area (water amount) is not smaller than a predetermined threshold level (th) (Step 201). If the water amount is not smaller than th, the water amount corresponds to a region indicated by A1 in FIG. 13. Taking the signal waveform shown in FIG. 5 as an example, for example, when the water amount at D1 in FIG. 5 exceeds th, the water amount corresponds to region A1 shown in FIG. 13. Also, if the value at D1 is approximate to the value shown in FIG. 5 even when raindrops flow down from the roof of vehicle, the water amount will correspond to the region indicated by A1 in FIG. 13.

In other words, even when the vehicle goes into a tunnel from a rainfall situation and the rainwater adhering to the roof of vehicle flows down, it cannot be judged, at this stage, whether or not the water passing through the detection area is due to rainfall.

If the water amount is not smaller than th, it is next judged whether or not a raindrop has impacted on the detection area (Step 202).

If no raindrop has impacted on the detection area, this case corresponds to a region indicated by hatched portion A2 in FIG. 14. This region indicates a case where no hit is detected though the water amount is large, so that it is presumed that the water carried by wiping operation of wiper is not raindrops due to rainfall (Step 203). Thereby, for example, even when the vehicle goes into a tunnel from a rainfall situation and the rainwater adhering to the roof of vehicle flows down, it can be judged that the situation has changed.

Next, the judging section 29 makes a request, for example, to decrease the frequency of wiping operation of the wiper (Step 204). Thereby, even when the situation changes as described above, the operation of the wiper can be controlled according to the change of situation.

The wiper control request in Step 204 is made to match the wiper wiping timing with the driver's sense. Therefore, the control should be changed according to the operation state of wiper at that time. For example, the judging section 29 receives a signal concerning the current operation state of the wiper from the motor vehicle controlling computer, and makes the following judgment.

When the wiper operates at a high wiping speed, the wiping speed is switched over to a lower speed. Also, when the wiper operates in a continuous mode (no waiting time), the mode may be changed to an intermittent mode, and when the wiper operates with a short period of wiping operation, the period may be changed over to a longer period. Further, when the wiper operates in an intermittent mode, the mode may be transferred to a waiting state (no wiping operation).

Although it is useful to change the frequency of wiping operation of a wiper according to a change of situation, if the frequency of wiping operation is changed based on the result of only one process performed by Steps 201 through 204, a trouble may occur. For example, rainfall cannot sometimes be caught by one process because of a small detection area, or the frequency of wiping operation is switched over frequently in a short period of time, which gives a sense of strangeness to the driver.

Therefore, it is preferable that the judgments in Steps 201 and 202 are made a plurality of times, or only the judgment in Step 202 is made a plurality of times after Step 201, and when the result of "No" in Step 202 (no impact of raindrop) continues a plurality of predetermined times, a request for decreasing the frequency of wiping operation of the wiper is made.

In the above-described example, in Step 202, judgment is made based on the presence or absence of an impact (impact of one time) of a raindrop on the detection area. However, the present invention is not limited to this example. For example, the number of times of detected impact of a raindrop on the detection area is summed up, and judgment may be made based on the summed-up number of times of impact. Specifically, the case where the summed-up number of times of impact exceeds a predetermined threshold value is caused to correspond to "impact" in Step 202, and the case where the summed-up number of times of impact does not exceed a predetermined threshold value is caused to correspond to "not impact" in Step 202.

(Change of Threshold Value)

Next, a method for changing the predetermined threshold value used for evaluating the amount of water passing through the detection area is explained. The amount of water passing through the detection area, the water being carried by wiping operation of a wiper, changes with the increase/decrease in amount of rainfall. In addition, the amount of water passing through the detection area changes with the increase/decrease in the period of wiping operation of the wiper. Therefore, even if the amount of rainfall is constant, the amount of water passing through the detection area can change due to the change of the period of wiping operation. In such a case, it is difficult to evaluate only the amount of rainfall exactly.

Thereupon, the threshold value is preferably changed according to the period of wiping operation of a wiper. By doing this, an influence of change of the period of wiping operation of the wiper can be removed from the value of the amount of water passing through the detection area, the water being carried by wiping operation of the wiper, so that the amount of rainfall can be evaluated exactly. In an example of processing, the judging section 29 changes the predetermined threshold value according to the period of wiping operation of the wiper.

Explaining more detailedly, the following knowledge was obtained regarding the relationship between the period of wiping operation of a wiper and the amount of water passing through the detection area, the water being carried by wiping operation of the wiper.

First, in the case where the rainfall situation does not change, the amount of water passing through the detection area, the water being carried by a wiper, increases as the period of wiping operation of the wiper increases. Considering a theoretical model, in the case where the amount of rainfall is not so large, the density of raindrop is uniform, and the diameter of raindrop is fixed, the amount of water passing through the detection area increases in proportion to the period of wiping operation of a wiper.

Next, in the case where the amount of rainfall is small, and the diameter of raindrop is small, the amount of water passing through the detection area does not increase so much even if the period of wiping operation increases because the raindrop adhering to the windshield glass dries.

The amount of water that can be carried by a wiper has a fixed limitation. Since a general wiper blade has a straight shape, the outflow of rain from both end portions thereof to the outside cannot be prevented. Therefore, when the amount of rainfall is large, some rainwater escapes to the outside. In addition, the rain escapes from the wiper blade due to a centrifugal force produced by the turning of the wiper, the gravity acting on the water gathered by the wiper, and the like.

Also, when the amount of water passing through the detection area becomes a fixed value or larger, almost all light sent from the light emitting element penetrates the glass at the detection area, so that the output signal of photo detector reaches the lower limit, and hence a further increase in the amount of water cannot be detected.

Figure 15:
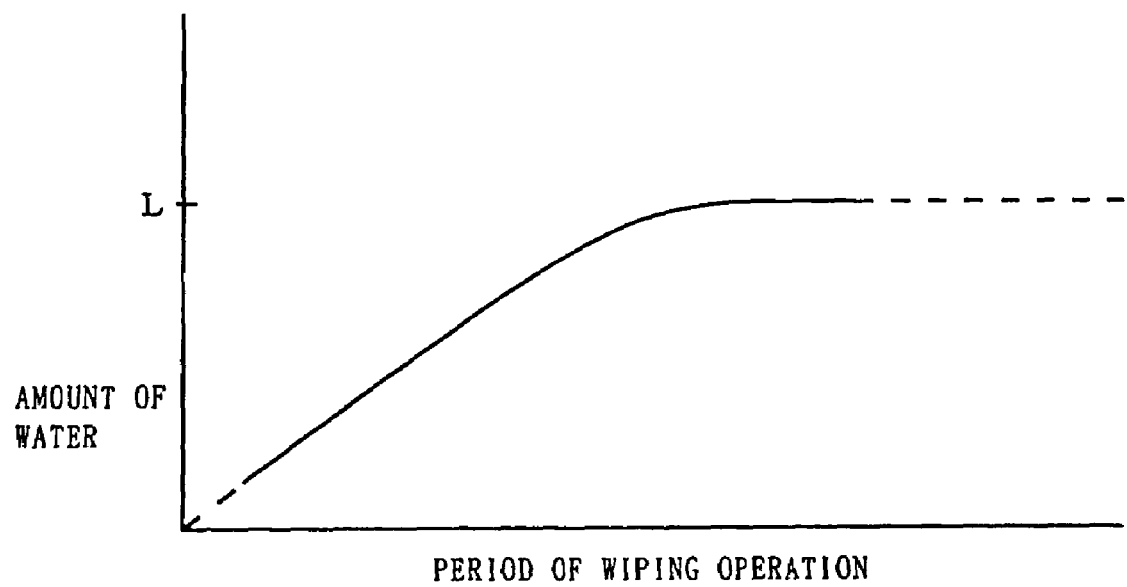
FIG. 15 is a chart showing the conceptualized relationship between the period of wiping operation and the amount of water passing through a detection area, with the water being carried by a wiper in the case where the amount of rainfall is large.

Because of the above-described fact, when the amount of rainfall is large, the detection result of the amount of water passing through the detection area, the water being carried by a wiper, tends to saturate at a fixed value (L) as shown in FIG. 15. FIG. 15 is a chart showing the conceptualized relationship between the period of wiping operation and the detection result of the amount of water passing through the detection area, the water being carried by a wiper in the case where the amount of rainfall is large. For such a relationship between them, an approximate value may be determined by a predetermined logarithmic function.

Another factor that exerts an influence to the amount of water is the deterioration in wiper blade. If the wiper blade deteriorates, rain comes off through a gap produced at the blade tip. The smaller the amount of rainfall is, the higher the ratio of the coming-off amount to the amount of water gathered by the wiper is, so that the influence of deterioration in a wiper blade increases. In addition, as other factors, the above-described water collecting at the stop position, water flowing to the wiper wiping region, and the like can be cited.

From the above-described knowledge, when the threshold value is changed with the period of wiping operation of a wiper, it is preferable that the threshold value be set further considering other parameters such as the amount of rainfall. Specifically, for example, when the amount of rainfall is small, the increase rate of threshold value is decreased, and when the amount of rainfall is large, a fixed upper limit of threshold value is provided.

Another Embodiment

Figure 16:
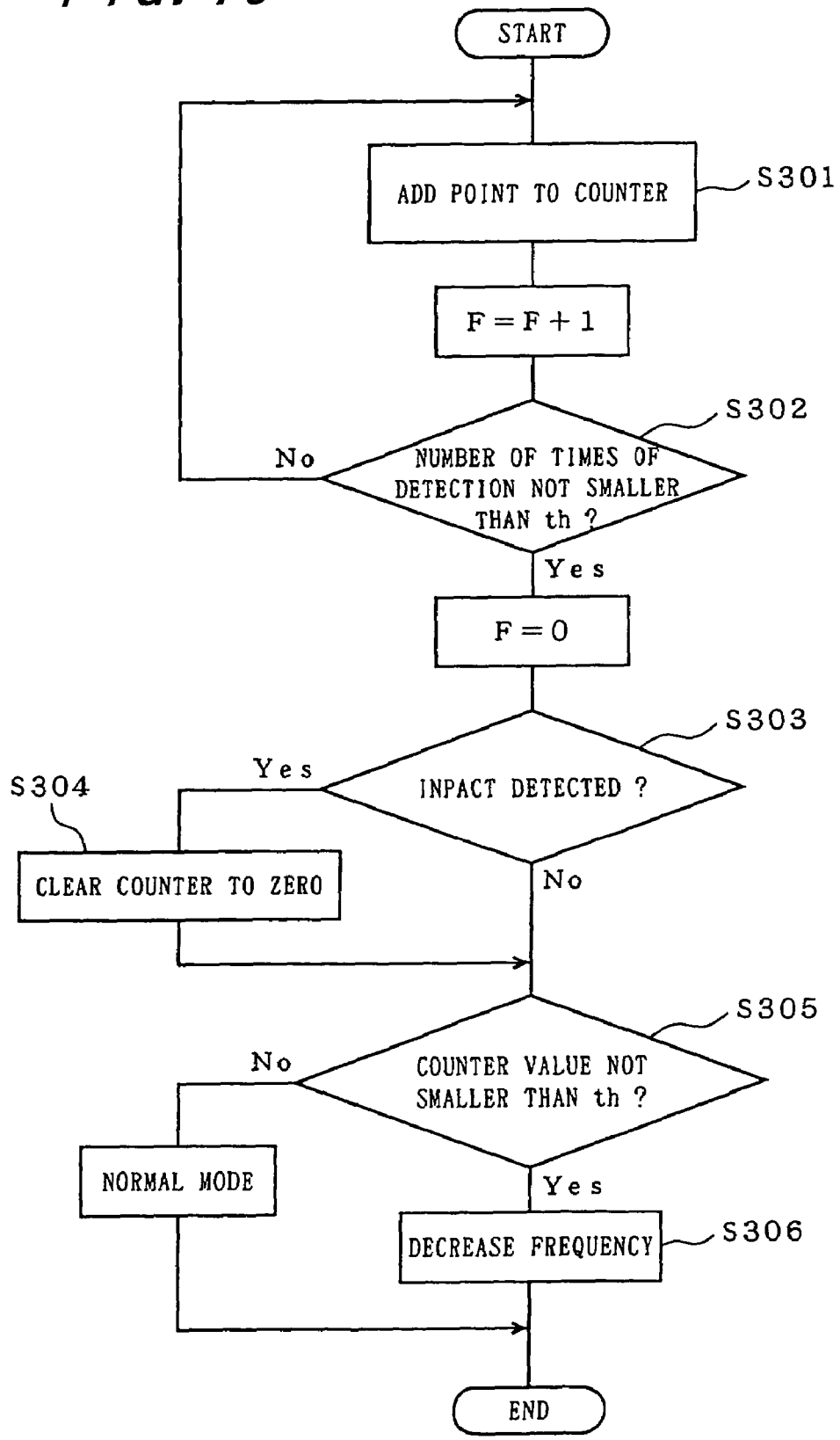
FIG. 16 is a flowchart for illustrating a flow of control processing.

Next, specific control processing in accordance with another embodiment will be typically shown. FIG. 16 is a flowchart for illustrating a flow of control processing, FIG. 17 is a chart for illustrating the relationship between wiper operation signal and water amount detection timing, and FIG. 18 is a matrix for illustrating the relationship between water amount, waiting time, and point value.

As shown in FIG. 16, the detecting section 28 adds the detected water amount to a counter (Step 301). This embodiment does not take a form such that the actual water amount itself is added. A predetermined point value determined by the combination of the actual water amount and the wiper waiting time is used as the water amount. Hereunder, this point value is explained.

Figures 17A, 17B:
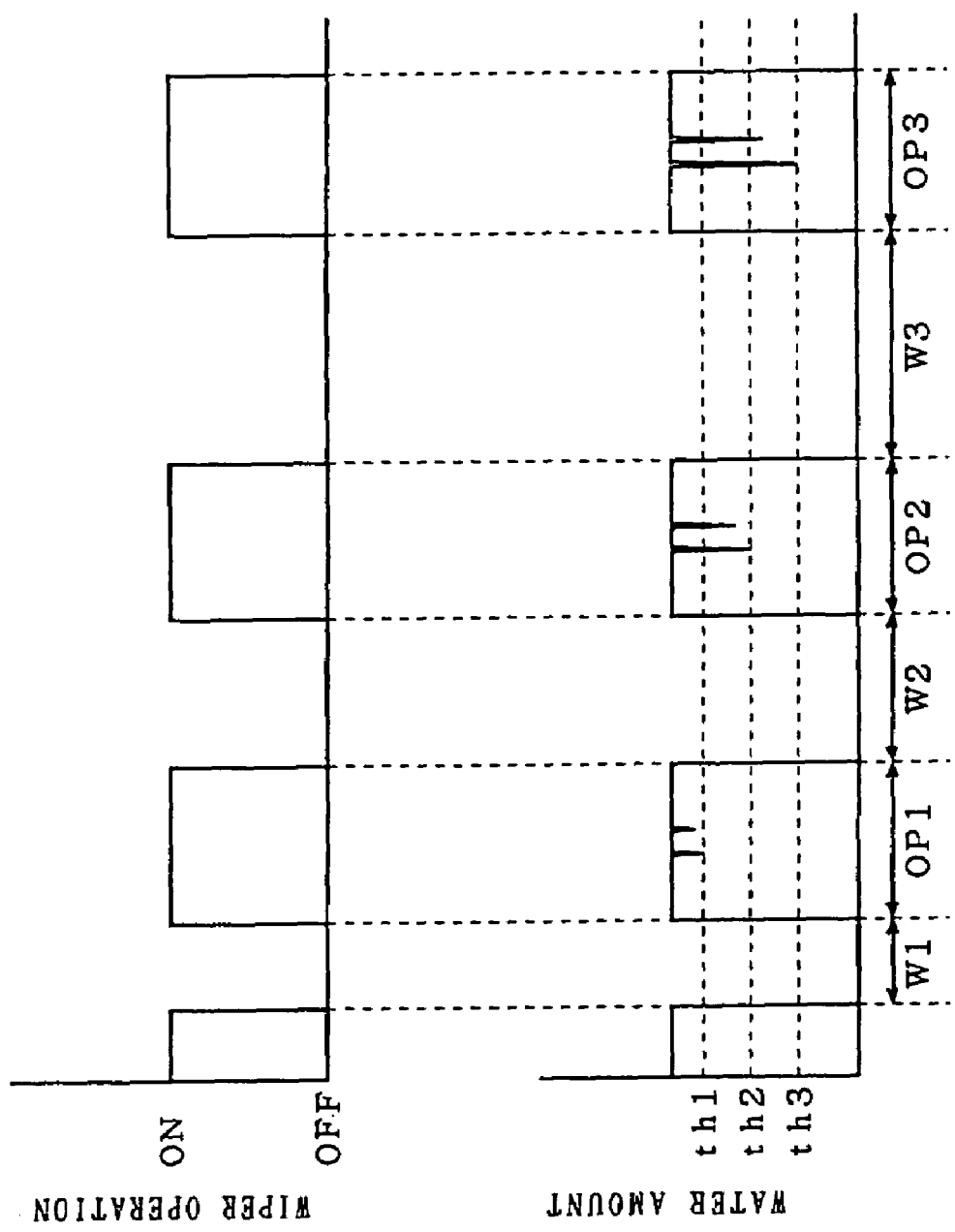
FIGS. 17A and 17B are a chart for illustrating the relationship between wiper operation signal and water amount detection timing.

As shown in FIG. 17A, the wiper operates for a period during which the operation signal is ON (operation period), and the wiper is in a waiting state for a period during which the operation signal is OFF (waiting period). In FIG. 17, the operation period is indicated as OP1, OP2 and OP3, and the waiting period is indicated as W1, W2 and W3. Also, W1, W2 and W3 are periods having a different length respectively (W1<W2<W3). As shown in FIG. 17B, the water amount is detected from the signal of the photo detector during the operation period.

When a water amount is detected, the detecting section 28 refers to the waiting period just before the operation period for which that water amount is detected. Then, a point value is determined from the combination of the value of water amount and the length of waiting period. Specifically, the point value is determined using the matrix of FIG. 18. In the matrix shown in FIG. 18, the point values are arranged so as to increase with an increase in water amount and decrease with an increase in waiting period.

As one example, it is assumed that a water amount of level th1 is obtained within the first operation period OP1. The waiting period just before OP1 is W1. By applying W1 and th1 to the matrix of FIG. 18, a point value of 6 is obtained. The thus obtained point value of 6 is added to the counter. By utilizing the point value configured as described above, the influence due to the change of waiting time can be removed from the detected water amount.

Next, the detecting section 28 judges whether or not the number of times of detection of water amount is not smaller than a predetermined number of times (Step 302), and repeats the processing in Step 301 until the number of times of detection reaches the predetermined number of times. For example, an example in which the predetermined number of times is three is explained. For the second operation period OP2, the water amount of level th2 is obtained, and the waiting period is W2. Therefore, a point value of 6 is added to the counter. Similarly, for the third operation period OP3, a point value of 6 is added to the counter. At this stage, 18 points are counted in the counter.

If the number of times of detection reaches the predetermined number of times in Step 302, then, the judging section 29 judges whether or not the impact of a raindrop on the detection area has been detected by the detecting section 28 (Step 303). It is assumed that the detection of the impact of a raindrop is performed by the above-described method, and the detection result is stored in a predetermined memory.

If the impact of a raindrop is detected, the counter in which the point value is counted is cleared to zero (Step 304).

Next, the judging section 29 judges whether or not the value of counter is not smaller than the threshold value th (Step 305). The case where the value of counter is smaller than the threshold value th includes a case where the count value (18 points in the above-described example) itself of the counter is smaller than the threshold value and a case where the counter is cleared in Step 304.

If the value of counter is not smaller than the threshold value th in Step 305, a request is made to decrease the frequency of wiping operation of a wiper (Step 306). In Step 305, the case where the value of counter is not smaller than the threshold value th means a case where the impact of a raindrop is not detected though the amount of rainfall is a fixed value or larger.

According to this embodiment, the present invention can be carried out using a low CPU load and memory capacity.

The above is an explanation of the present invention given by using the preferred embodiments, and the present invention is not limited to the above-described embodiments. A person skilled in the art can make variations or modifications appropriately based on the technical spirit disclosed herein without departing from the scope of the present invention. Also, such variations and modifications are embraced in the present invention.

INDUSTRIAL APPLICABILITY

As described above, according to the present invention, control can be carried out so that wiping operation does not take place at unnecessary timing, and wiper operation matching the driver's sense can be achieved.

The present invention is especially useful in the case where the frequency of wiping operation of a wiper must be decreased at the time when the environment in which the vehicle is placed is changed from a rainfall situation to other situations.

The invention claimed is:

1. A method for controlling an operation of a wiper by directing light emitted from a light emitting element to a detection area provided at a part of a wiper wiping region of a vehicular windshield glass, receiving light reflected on the detection area by a photo detector, and detecting a state of the detection area, comprising the steps of:
   (a) collecting water by a wiping operation;
   (b) detecting an amount of the collected water passing through the detection area;
   (c) detecting an impact of a raindrop on the detection area;
   (d) judging whether or not the amount of water passing through the detection area is not smaller than a predetermined threshold value;
   (e) judging whether or not the impact of the raindrop on the detection area is detected if the amount of water passing through the detection area is not smaller than the predetermined threshold value; and
   (f) carrying out control to decrease frequency of wiping operation of the wiper if the impact of the raindrop on the detection area is not detected.

2. The wiper control method according to claim 1, wherein when a judgment result that the amount of water passing through the detection area is not smaller than the predetermined threshold value and the impact of the raindrop on the detection area is not detected continues a plurality of times, control is carried out to decrease the frequency of wiping operation of the wiper.

3. The wiper control method according to claim 1 or 2, wherein when the wiper operates at a high wiping speed, the control to decrease the frequency of wiping operation of the wiper is control to switch over the wiping speed to a lower speed.

4. The wiper control method according to claim 1 or 2, wherein when the wiper operates in a continuous mode, the control to decrease the frequency of wiping operation of the wiper is control to switch over the mode to an intermittent mode.

5. The wiper control method according to claim 1 or 2, wherein when the wiper operates in an intermittent mode, the control to decrease the frequency of wiping operation of the wiper is control to switch over the period of wiping operation to a longer period.

6. The wiper control method according to claim 1 or 2, wherein when the wiper operates in an intermittent mode, the control to decrease the frequency of wiping operation of the wiper is control to switch over the state to a waiting state.

7. A method for controlling an operation of a wiper by directing light emitted from a light emitting element to a detection area provided at a part of a wiper wiping region of a vehicular windshield glass, receiving light reflected on the detection area by a photo detector, and detecting a state of the detection area, comprising the steps of:
   (a) detecting an amount of the collected water passing through the detection area,;
   (b) detecting an impact of a raindrop on the detection area with the water being carried by wiping operation of the wiper;
   (c) judging whether or not the amount of water passing through the detection area is not smaller than a predetermined threshold value;
   (d) judging whether or not the impact of the raindrop on the detection area is detected if the amount of water passing through the detection area is not smaller than the predetermined threshold value; and
   (e) carrying out control to decrease frequency of wiping operation of the wiper if the impact of the raindrop on the detection area is not detected;
   wherein when the wiper operates in an intermittent mode, the predetermined threshold value is changed according to a period of wiping operation of the wiper.

8. A device for controlling an operation of a wiper by directing light emitted from a light emitting element to a detection area provided at a part of a wiper wiping region of a vehicular windshield glass, receiving light reflected on the detection area by a photo detector, and detecting a state of the detection area, comprising:
   a wiping frequency switching-over means, the wiping frequency switching-over means comprising:
      means for receiving as inputs a detection result of the amount of water passing through the detection area, with the water being carried to the detection area by wiping operation of the wiper, and a detection result of an impact of a raindrop on the detection area;
      means for judging whether or not the amount of water passing through the detection area is not smaller than a predetermined threshold value;
      means for judging whether or not the impact of the raindrop on the detection area is detected if the amount of water passing through the detection area is not smaller than the predetermined threshold value; and
      means for carrying out control to decrease frequency of wiping operation of the wiper if the impact of the raindrop on the detection area is not detected.

9. The wiper control device according to claim 8, wherein, the wiping frequency switching-over means further comprising means for carrying out control to decrease the frequency of wiping operation of the wiper, when a judgment result that the amount of water passing through the detection area is not smaller than the predetermined threshold value and the impact of the raindrop on the detection area is not detected continues a plurality of times.

10. A method for controlling an operation of a wiper by directing light emitted from a light emitting element to a detection area provided at a part of a wiper wiping region of a vehicular windshield glass, receiving light reflected on the detection area by a photo detector, and detecting a state of the detection area, comprising the steps of:
  (a) collecting water by a wiping operation;
  (b) detecting an amount of the collected water passing through the detection area;
  (c) detecting an impact of a raindrop on the detection area;
  (d) judging whether or not the amount of water passing through the detection area is not smaller than a predetermined threshold value;
  (e) judging whether or not the impact of the raindrop on the detection area is detected if the amount of water passing through the detection area is not smaller than the predetermined threshold value; and
  (f) carrying out control to decrease frequency of wiping operation of the wiper if the impact of the raindrop on the detection area is not detected, wherein:
  step (a) includes the step of collecting water from first and second portions of the windshield glass, the first and second portions being different in area; and
  step (d) includes the steps of determining a difference between the collected water from the first portion and the collected water from the second portion and judging whether the difference is not smaller than the predetermined threshold value.

11. A method for controlling an operation of a wiper by directing light emitted from a light emitting element to a detection area provided at a part of a wiper wiping region of a vehicular windshield glass, receiving light reflected on the detection area by a photo detector, and detecting a state of the detection area, comprising the steps of:
  (a) collecting water by a wiping operation;
  (b) detecting an amount of the collected water passing through the detection area;
  (c) detecting an impact of a raindrop on the detection area;
  (d) judging whether or not the amount of water passing through the detection area is not smaller than a predetermined threshold value;
  (e) judging whether or not the impact of the raindrop on the detection area is detected if the amount of water passing through the detection area is not smaller than the predetermined threshold value; and
  (f) carrying out control to decrease frequency of wiping operation of the wiper if the impact of the raindrop on the detection area is not detected,
  wherein:
    when a judgment result that the amount of water passing through the detection area is not smaller than the predetermined threshold value and the impact of the raindrop on the detection area is not detected continues a plurality of times, control is carried out to decrease the frequency of wiping operation of the wiper;
    step (a) includes the step of collecting water from first and second portions of the windshield glass, the first and second portions being different in area; and
    step (d) includes the steps of determining a difference between the collected water from the first portion and the collected water from the second portion and judging whether the difference is not smaller than the predetermined threshold value.

\* \* \* \* \*